United States Patent
Membrives et al.

(10) Patent No.: US 10,372,917 B1
(45) Date of Patent: Aug. 6, 2019

(54) UNIQUELY-REPRESENTED B-TREES

(71) Applicant: GOOGLE LLC, Mountain View, CA (US)

(72) Inventors: Etienne Membrives, Saint-Rémy-lès-Chevreuse Yvelines (FR); Przemyslaw Pietrzkiewicz, Paris (FR); Benjamin Lerman, Paris (FR); Despoina Vouzoukidou, Puteaux Hauts-de-Seine (FR)

(73) Assignee: GOOGLE LLC, Mountain View, CA (US)

( * ) Notice: Subject to any disclaimer, the term of this patent is extended or adjusted under 35 U.S.C. 154(b) by 77 days.

(21) Appl. No.: 15/370,731

(22) Filed: Dec. 6, 2016

Related U.S. Application Data

(60) Provisional application No. 62/411,057, filed on Oct. 21, 2016.

(51) Int. Cl.
   *G06F 21/60* (2013.01)
   *G06F 16/901* (2019.01)

(52) U.S. Cl.
   CPC ........ *G06F 21/602* (2013.01); *G06F 16/9024* (2019.01); *G06F 16/9027* (2019.01)

(58) Field of Classification Search
   CPC ......... G06F 17/30327; G06F 17/30961; G06F 17/30958; G06F 21/602
   See application file for complete search history.

(56) References Cited

U.S. PATENT DOCUMENTS

| | | | |
|---|---|---|---|
| 5,440,732 A | | 8/1995 | Lomet et al. |
| 5,644,763 A | | 7/1997 | Roy |
| 2003/0051151 A1 | | 3/2003 | Asano et al. |
| 2005/0044089 A1 | | 2/2005 | Wu et al. |
| 2006/0218176 A1 | * | 9/2006 | Sun Hsu ........... G06F 17/30097 |
| 2008/0086470 A1 | | 4/2008 | Graefe |
| 2008/0307181 A1 | * | 12/2008 | Kuszmaul ........... G06F 11/1471 |
| | | | 711/164 |
| 2010/0257149 A1 | | 10/2010 | Cognigni et al. |
| 2013/0185271 A1 | * | 7/2013 | Strain ............... G06F 17/30961 |
| | | | 707/704 |

(Continued)

OTHER PUBLICATIONS

Clifford A. Shaffer "Data Structures and Algorithm Analysis", Edition 3.2 (Java Version) Jan. 2, 2012 Update 3.2.0.3 (Year: 2012).*

(Continued)

*Primary Examiner* — Eleni A Shiferaw
*Assistant Examiner* — Bassam A Noaman
(74) *Attorney, Agent, or Firm* — Botos Churchill IP Law LLP

(57) ABSTRACT

Aspects of the disclosure relate to hierarchical data structures. A method is disclosed for storing data in a hierarchical data structure. The method may include receiving first data to be committed in a distributed database, the first data including one or more data elements. A result of the selection function may be computed, applying the selection function to each of the one or more data elements. A first node of a first hierarchical data structure may be identified based on the result of the selection function applied to a first data element. The first node of the first hierarchical data structure may be updated using the first data element.

20 Claims, 8 Drawing Sheets

(56) References Cited

U.S. PATENT DOCUMENTS

2017/0109295 A1* 4/2017 Lasperas ............ G06F 12/1408

OTHER PUBLICATIONS

Greenwald, et al., "Harmony: A Synchronization Framework For Tree-Structured Data", Sep. 2003, Retrieved from the Internet Oct. 19, 2016: <http://www.cis.upenn.edu/~bcpierce/papers/harmonyslides-2003aug.pdf> (65 pages).

Comer, "The Ubiquitous B-Tree" Computing Surveys, vol. II, No. 2, Jun. 1979. Retrieved from the Internet Oct. 19, 2016: <http://people.cs.aau.dk/~simas/aalg06/UbiquitBtree.pdf> (17 pages).

Aguilera, et al. "A Practical Scalable Distributed B-Tree", PVLDB '08, Aug. 23-28, Auckland, New Zealand, Retrieved from the Internet Oct. 19, 2016: <http://citeseerx.ist.psu.edu/viewdoc/download?doi=10.1.1.140.7244&rep=rep1&type=pdf> (12 pages).

Weil, et al. "Ceph: A Scalable, High-Performance Distributed File System", University of California, Santa Cruz. Retrieved from the Internet Oct. 19, 2016: <http://dl.acm.org/citation.cfm?id=1298485> (14 pages).

H.V. Jagadish, et al., "BATON: A Balanced Tree Structure for Peer-to-Peer Networks", Retrieved from the Internet Oct. 19, 2016; <https://dspace.mit.edu/bitstream/handle/1721.1/30214/CS004>, (pp. 1-9).

Daniel Golovin, "B-Treaps: A Uniquely Respesented Alternative to B-Trees", Computer Science Dept., Carnegie Mellon Univ., Pittsburgh, PA, USA. Retrieved from the Internet Oct. 19, 2016: <http://www.cs.cmu.edu/~dgolovin/papers/btreap.pdf> (12 pages).

"Treap (A Randomized Binary Search Tree)", GeeksforGeeks. [online] [retrieved Oct. 19, 2016]: <http://www.geeksforgeeks.org/treap-a-randomized-binary-search-tree/>, printed on Nov. 7, 2016 (4 pages).

T. Johnson, A. Colbrook, "A Distributed Data-balanced Dictionary Based on the B-link Tree", Report Date: Feb. 1992; Massachusetts Institute of Technology 1992, Published In: Parallel Processing Symposium, 1992. Proceedings., Sixth International, Publisher IEEE (online) Retrieved from the Internet Oct. 19, 2016: <http://ieeexplore.ieee.org/document/223026/> (20 pages).

"Introduction to Noms" 2016 GitHub, Inc. [online] (retrieved Oct. 19, 2016) <https://github.com/attic-labs/noms/blob/c6d99f2fabcf870d9cf0cd4de9c540300de3f030/doc/intro.md#prolly-trees-probabilistic-b-trees>, printed on Nov. 7, 2016. (7 pages).

* cited by examiner

UNIQUELY-REPRESENTED B-TREES

CROSS-REFERENCE TO RELATED APPLICATIONS

This application claims the benefit of the filing date of U.S. Provisional Patent Application No. 62/411,057 filed Oct. 21, 2016, the disclosure of which is hereby incorporated herein by reference.

BACKGROUND

B-trees are hierarchical structures used to store sorted data for efficient access. In a typical B-tree structure, the shape of a B-tree depends on a modification history of the B-tree. For this reason, two B-trees with the same data may not have the same internal nodes, and as such, may vary in their representations. A collection of computing devices may store B-trees with the same content in each of the computing devices within the collection. Due to varied representations, synchronized modification of B-trees amongst a collection of computing devices may require sending a replication of an entire database every time a modification is made, implementation of state based modifications, implementation of layer based modifications, locking a segment of a database resulting in unavailability of portions of data, etc.

Generating reproducible B-tree structures presents challenges due to complexities and inefficiencies involved. One example of generating a reproducible structure is using a virtual treap data structure, which is a randomized balanced binary search tree using heap property, and partitioning the virtual treap data structure into a B-tree. However, the treap structure requires complex data manipulations. Another example is using a probabilistic B-tree, where the number of values in each node is determined probabilistically based on the data in the tree, however, a rolling hash of all of the data values need to be calculated, resulting into inefficiency and lack of flexibility in smaller data exchanges among multiple devices. Additionally, skip lists, which are data structures with stacked linked lists, may be deterministic, but changing an individual data element may require changing potentially all values in the list.

BRIEF SUMMARY

The present technology provides for maintaining consistency of B-trees amongst a collection of computing devices. For example, when two computing devices modify an identical B-tree on each device, the modifications are represented consistently.

The disclosure provides for a method for updating data in a hierarchical data structure. The method may include receiving first data to be committed in a distributed database, the first data including one or more data elements. A result of a selection function is computed, applying the selection function to each of the one or more data elements. A first node of a first hierarchical data structure is identified based on the result of the selection function applied to a first data element. The first node of the first hierarchical data structure is updated using the first data element. The first hierarchical data structure may be a B-tree. The selection function may include a cryptographic hash function.

The cryptographical hash function may be selected based on a probable output of the cryptographic hash function when the function is applied to each data element.

The updating of the first node of the first hierarchical data structure may include adding a new element. With regards to adding the first element, the identifying the first node of the first hierarchical data structure may further include finding a leaf node in the first hierarchical data structure where the leaf node is within a branch where the first element is to be added, and determining whether the new data element should be added to the leaf node. The determination may be based on the result of the selection function for the first data element. If the first data element should be added to the leaf node, the first data element may be added to the leaf node such that the leaf node is the first node. If the first data element should not be added to the leaf node, the first data element may be added to a parent node of the leaf node. If the leaf node is a grouped node, the leaf node may be divided in two separate leaf nodes.

Additionally, if the first data element is added to the parent node, the selection function may be updated for a level of the hierarchical structure that holds the parent node. Based on an updated result of the updated selection function for the first data element, it may be determined whether the first data element should be moved to a grandparent node. If the first data element should be moved to a grandparent node, the first data element may be moved to a grandparent node and the parent node may be divided in two separate parent nodes.

The updating the first node of the hierarchical data structure may include removing an existing element. With regards to removing an existing element, the identifying the first node of the first hierarchical data structure may further include searching the existing element in the first hierarchical data structure, and removing the existing element from the first hierarchical data structure. The method may further include merging the elements of a child node of the existing element with elements of another existing node.

The method may further include updating a second hierarchical data structure, for example on a separate device in a distributed database, wherein updating the second hierarchical data structure results in internal nodes of the second hierarchical data structure being consistent with the internal nodes of the first hierarchical data structure. The method may include receiving second data, including one or more second data elements. A second node of the second hierarchical data structure may be updated using a particular second data element, based on a second result of the selection function for the particular second data element. The hierarchical data structures may have the same representation regardless of whether the first node is updated before the second node, or the second node is updated before the first node.

The disclosure provides for a method for constructing a hierarchical data structure. The method may include receiving data including one or more data elements. A first level of a hierarchical data structure may be constructed using the one or more data elements. The construction may include placing the one or more data elements on the first level of the hierarchical data structure. A result of a selection function may be computed by applying the selection function to each one of the one or more data elements. Based on the result of the selection function for a given data element, the given data element may be moved to a second level of the hierarchical data structure. If more than one child data elements having a value less than the given data element remain in the first level of the hierarchical data structure, the child data elements may be grouped in a first grouped node. Additionally, the selection function may be different for each level of the hierarchical data structure. The selection function may include a cryptographic hash function.

The method may further include determining whether the additional data element should be moved to the second level of the hierarchical data structure based on the result of the selection function for an additional data element on the first level. If the additional data element should be moved to the second level of the hierarchical data structure, then the additional data element may be moved to the second level of the hierarchical data structure. If more than one additional child data elements having a value less than the additional data element remain in the first level, the additional child data elements may be grouped in an additional grouped node and if more than one additional child data elements having a value greater than the additional data element remain in the first level, the additional child data elements may be grouped in another grouped node. If the additional data element should not be moved to the second level, then if more than one additional child data elements having a value greater than a last data element on the second level remain in the first level, the additional child data elements may be grouped in a further grouped node.

The method may further include determining whether one or more second level data elements exist on the second level of the hierarchical data structure. If the one or more second level data elements exist, then the selection function for the second level of the hierarchical data structure may be updated. An updated result of the selection function may be computed by applying the selection function on the one or more second level data elements. Based on the updated result of the updated selection function for a given second level data element, the given second level data element may be moved to a next level of the hierarchical data structure. If more than one second level child data elements having a value less than the given second level data element remain in the second level, the second level child data elements may be grouped in a second level grouped node.

The disclosure provides for a system including one or more memories for storing a hierarchical data structure and one or more processors in communication with the one or more memories. The one or more processors may include instructions to receive first data to be committed in a distributed database, the first data including one or more data elements, to compute a result of a selection function applied to each of the one or more data elements, to identify a first node of a first hierarchical data structure based on the result of the selection function for a first data element, and to update the first node of the first hierarchical data structure using the first data element.

DETAILED DESCRIPTION

Overview

Figure 1:
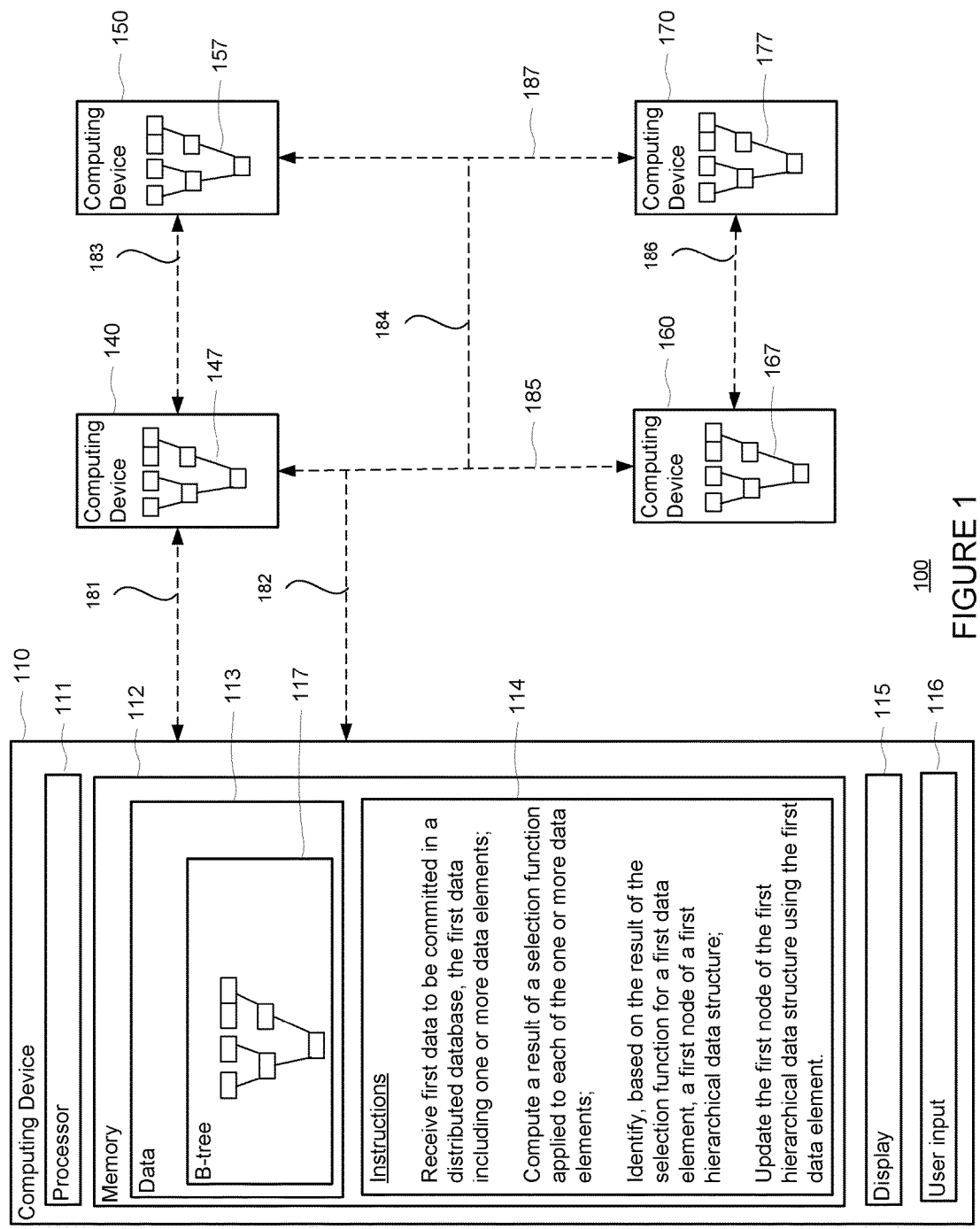
FIG. 1 is a functional diagram of an example system in accordance with aspects of the disclosure.

This technology relates to uniquely represented hierarchical data structures, such as B-trees, which are used to store sorted data for efficient access. A B-tree is updated using a cryptographic hash of a data element to be inserted into the B-tree or removed from the B-tree. A result of the hash indicates a node of the B-tree at which the data should be stored. In this regard, when a collection of computing devices each holds an identical B-tree as the other devices in the collection, modifications to any B-tree on any device are represented consistently, providing for synchronization among B-trees on the different devices. Additionally, adding or deleting a data element may require changing only one branch of the B-tree.

A system may be used for storing data in a uniquely represented data structure, such as a B-tree. A collection of computing devices may allow for the devices to communicate with one another. A copy of a database may be stored on each device. Each database on each device may store and update data in a uniquely represented B-tree. When one device communicates with another, the unique representation of the B-trees may allow for synchronization among the devices. This uniquely represented data structure may be achieved using a selection function applied to data to be stored in the B-tree.

The data may be received at a computing device. The data may include one or more data elements. Each data element may include a key and a value. Operations, such as sorting, hashing, selecting, etc., may be applied on the key. The selection function may be applied to the data. For example, a selection function may be constructed using a cryptographic hash function. The hash function may be applied to a key in an individual data element, regardless of the size of the data element. The result of the selection function may determine where to store the data element within the B-tree.

The B-tree may include a number of levels. Keys may be sorted at each level of the B-tree and grouped in nodes. A level may contain multiple nodes. A first key having a first value and a second key having a second value are grouped into the same node if no key from the level above has a value between the first and second value. As the tree may be built bottom-up, the number of levels does not need to be determined in advance. When the selection function is applied on the key of the received data element, the selection function may return a level on which the data element is to be stored. Within a level, only one node may store the data element. When the appropriate node is found, the data element is stored in that node.

There may be a universal selection function for all possible levels within the B-tree. This type of a selection function may return the level on which a data element needs to be stored. There may also be a series of selection functions, where one selection function may exist per level of the B-tree. As each selection function for a particular level is applied, the selection function may indicate whether or not the data element should be stored at that particular level. Additionally, a series of selection functions may also be used to return a level where to store the data element. For example, an additional function may be set up with a counter where each of the selection functions within the series is applied on the data element, incrementing the counter for each level. When a selection function for a current level indicates that the data element should be stored at that level, the additional function may return the counter which indicates the level for storing the data element. Selection functions may be constructed so as to tune the expected size of the nodes under probability theory. An expected number of levels may be deduced from the expected size of the nodes and the number of data elements in the B-tree. The expected number of levels may be used to limit the maximum level returned by the selection function, which may limit extreme operating situations.

The selection functions are deterministic functions. In this regard, the level of each key inside the tree may itself be deterministic, and the position of each key within each level is determined by the other keys, but it may be independent of the order of insertion into the tree.

The selection function may be chosen based on a probable output of the selection function applied to the data. For example, a probability of moving a key to the next level may be chosen. From this probability, a selection function may be chosen so that it is highly improbable to find a set of keys where the probability of moving a random key from this set to the next level is different of the chosen probability. The selection function may use Strict Avalanche Criterion (SAC) properties, such that when applied to two inputs that differ by one bit, there is a 50% probability that the results of the function will be different. Moreover, a selection function may also be chosen such that for each level of the B-tree, when the function is applied on any given key, the result may be 0 or 1, where 0 may indicate the key does not belong at that level and 1 may indicate the key belongs at that level. One example of a selection function includes a cryptographic hash function. For example, for a hash function producing hashes of N bits represented by $H(k)$, and an expected size of nodes of $2^m-1$, the selection functions may be $F_i(k)=(H(k) \bmod 2^{mi}=0)$.

An initial B-tree may be constructed using the chosen selection function. Initially, all of the keys of a data set may be sorted, for example by value, and placed on a bottom level of a B-tree. For populating each level of the B-tree, a round of steps may be performed. The chosen selection function is applied using each key, starting with the first key of the sorted keys on the bottom level and repeating for each key in the sorting order. If the applied selection function is true for a particular key, then all keys before the particular key which have not been grouped in a node may be grouped together in a first node. A link to the first node may be associated to the particular key. The particular key may be moved to the next level. The function may be applied to remaining keys of the bottom level, moving to the next level any key meeting the criteria set for the chosen selection function. All remaining keys may be grouped in a last node and a link to the last node may be associated to the last key on the next level. If the next level is not empty, the round of steps is repeated on the next level. When an empty level is encountered, the constructing of the B-tree ends. By way of example, data containing a plurality of data elements is received. Each of the data elements holds a key. In a sorted order, the keys are: 1, 2, 3, 4, 5, 7, 9, 10, and 11. Here, the chosen selection function is $F_i(k)=(k \bmod 3^i=0)$, where i represents the level and k represents the key. The function is applied on each of the keys of the data. The first key that returns the result 0 when the chosen function is applied is 3 and is selected. All keys before 3, which include 1 and 2, are grouped in a first node. A link to the first node is associated with key 3 and key 3 is moved to the next level which is the second level. The next key returning a result 0 is 9. All keys before 9 which were not grouped (4, 5, and 7) are grouped in a second node, and a link to the second node is associated with 9. The remaining keys (10 and 11) are grouped in a third node and a link to the third node is associated with the last key (9) of the second level. For the second level, the function is applied on keys 3 and 9. The only key returning a result 0 is 9, and as such, it is moved to the next level, the third level. When the function is applied on keys on this level (9), no key returns a result 0, so no key is moved to the next level. Since the next level is empty, no more round is performed.

For an existing B-tree, the same chosen selection function may be used for updating the B-tree. Updating the B-tree may include adding data, deleting data, or other modifications.

A new element may be added to the B-tree. Initially, a leaf node in the B-tree may be identified where the new element is to be added, based on a comparison between the new key and the existing keys in each leaf node of the B-tree. Then applying the selection function, it may be determined whether the new element belongs in the parent node, and if so, the leaf node is split and the new element may be added to the parent node. Continuing the example above, a new element with the key "6" may be added to the B-tree. The leaf node containing the keys 4, 5, and 7 is identified as the node where the element with key "6" should be added. Since the selection function returns 0 when applied on the element "6," it is determined that the element with key "6" belongs in the parent node. Thus, the leaf node is split in two nodes, one node containing 4, 5 and another containing 7, and element with key "6" is added on the parent node containing "3."

An existing element may be removed from the B-tree. The existing element is located in the B-tree, for example by searching, and removed. The child nodes of the existing elements are merged together. Merging may involve grouping together elements of child nodes to be merged in one combined node. This may require additional merges down the tree. For example, grandchild nodes of the removed element may also need to be merged Still continuing with the above example, the key "9" is requested to be removed from the B-tree. Once key "9" is found on the B-tree, the keys 10 and 11, which are on a child node of key "9", are merged with key 7 from the neighboring node of the same level. Then key "9" is removed from the B-tree.

Applying the selection function, data structures may be updated on different devices and synchronized amongst the devices. For example, the first device and a second device may each update a copy of an identical B-tree with first data and second data, respectively. The second device may apply the selection function on the second data, identify a second node of the second B-tree on the second device based on the result of the applied function, and update the second B-tree at the second node using the second data. Because the same selection function is applied in making all updates, the internal nodes may be represented consistently no matter which device updates the B-trees. Thus, when the second device updates the second B-tree, the update may be synchronized with the update of the first B-tree made by the first device.

Different computing devices may make updates to the respective B-trees on each device while maintaining a consistent representation of the nodes in the B-trees. A first device updates B-tree 1 to add element "6" to the B-tree and to remove element "9". A second device updates B-tree 2, which was initially same as B-Tree 1, with the same transactions as the first device, but in a different order. In this example, the second device removes element "9" and then adds element "6". Both updates represent the same internal nodes as a result of the update applying the selection function. Thus, the two updates are synchronized.

The features described above may allow for improved representations of a B-tree. In this regard, the unique representation of the B-tree allows for only a segment of the database to be sent over to other devices and still be able to maintain synchronization amidst of different activities performed on the B-tree by different devices. Thus, ensuring uniquely representing B-trees may ensure that modifications to a data structure with the same content, but generated through different means, such as low latency synchronization or merge commits, are identical and do not require excessive data exchange.

Example Systems

FIG. 1 illustrates one possible system 100, in which the aspects disclosed herein may be implemented. Computing device 110 may be a computing device containing one or more processors 111, memory 112 and other components typically present in general purpose computing devices. Although FIG. 1 functionally represents processors 111 and memory 112 as single blocks within computing device 110, which is also represented as a single block, the system may include and the methods described herein may involve multiple processors, memories and devices that may or may not be stored within the same physical housing.

Memory 112 of computing device 110 may store information accessible by processors 111, including instructions 114 that may be executed by the processors 111. Memory 112 may also include data 113 that may be retrieved, manipulated or stored by processors 111. Memory 112 and the other memories described herein may be any type of storage capable of storing information accessible by the relevant processor, such as a hard-disk drive, a solid state drive, a memory card, RAM, DVD, write-capable memory or read-only memory. In addition, the memory may include a distributed storage system where data, such as data 113, is stored on a plurality of different storage devices that may be physically located at the same or different geographic locations.

The instructions 114 may be any set of instructions to be executed by processors 111 or other computing devices. The instructions may be stored in object code format for immediate processing by a processor, or in another computing device language including scripts or collections of independent source code modules, that are interpreted on demand or compiled in advance. Functions, methods and routines of the instructions are explained in more detail below. Processors 111 may be any conventional processor, such as a commercially available CPU. Alternatively, the processor may be a dedicated component such as an ASIC or other hardware-based processor.

Data 113 may be retrieved, stored or modified by computing device 110 in accordance with the instructions 114. The data may comprise any information sufficient to identify the relevant information, such as numbers, descriptive text, proprietary codes, pointers, references to data stored in other memories such as at other network locations, or information that is used by a function to calculate the relevant data. Data 113 may include a uniquely represented hierarchical data structure, B-tree 117, in accordance with the disclosure herein.

The computing device 110 may include a display 115 (e.g., a monitor having a screen, a touch-screen, a projector, a television, or other device that is operable to display information), and user input 116 (e.g., a mouse, keyboard, touch screen, microphone, etc.).

The computing device 110 may be a server computing device, client computing device, a smart phone, a tablet, a laptop computer, etc. Each computing device may be configured to communicate with other computing devices in a collection of computing devices, such as computing device 140, 150, 160, and 170. A copy of B-tree 117 may be stored on each of the computing devices 140, 150, 160, and 170 as B-trees 147, 157, 167, and 177, respectively. Each computing device may store and update data in the respective B-trees on each computing device. When one computing device communicates with another, represented by the arrows 181-187, the unique representation of the B-trees may allow for synchronization among the computing devices. This uniquely represented data structure may be achieved using a selection function applied to data to be stored in the B-tree, as disclosed herein.

Figure 2:
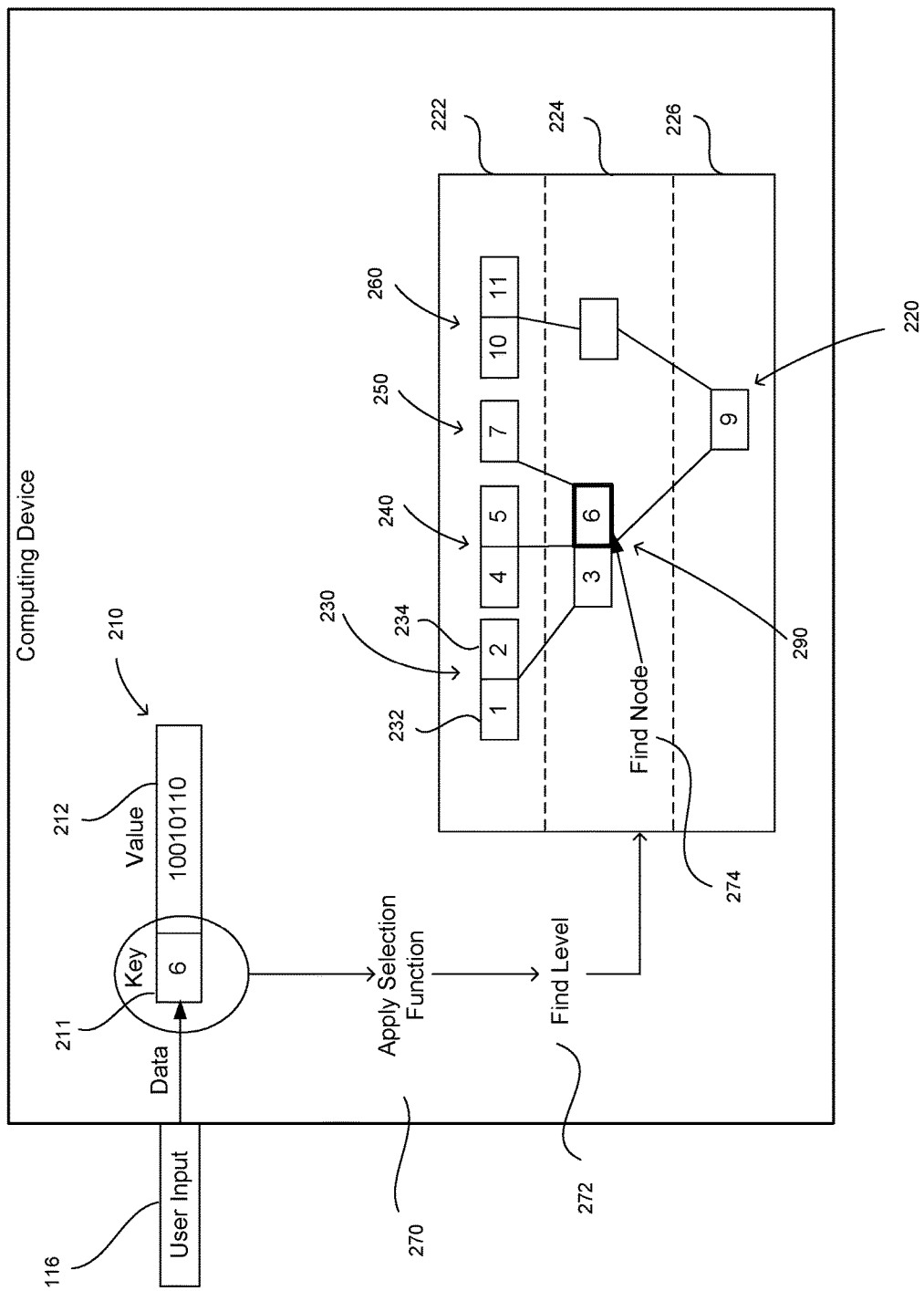
FIG. 2 is an example of storing data in a uniquely represented B-tree in accordance with aspects of the disclosure.

As shown in FIG. 2, the data may be received at a computing device through a user input 116. The data may include one or more data elements 210. Each data element may include a key 211 and a value 212. Operations, such as sorting, hashing, selecting, etc., may be applied on the key. The selection function may be applied to the data. For example, a selection function may be constructed using a cryptographic hash function. The hash function may be applied to a key in an individual data element, regardless of the size of the data element. The result of the selection function may determine where to store the data element within the B-tree.

The B-tree may include a number of levels. In FIG. 2, B-tree 220 includes three levels, level 222 being the first level or the bottom level, level 224 being the second level, and level 226 being the third and last level. Keys may be sorted at each level of the B-tree and grouped in nodes. A level may contain multiple nodes. In FIG. 2, level 222 has nodes 230, 240, 250, and 260. A first key having a first value and a second key having a second value are grouped into the same node if no key from the level above has a value between the first and second value. For example, where $K_n$ is a series of random variables over a set $\Omega$ of all possible keys, $V_0$ is a random vector of keys stored in a B-tree, and the k-th element of $V_0$ is noted $V_{0,k}$, two keys $k_a$ and $k_b$ with $k_a < k_b$ at level i belong to the same node if, and only if, $\neg \exists V_{i+1,k}, k_a < k < k_b$. In FIG. 2, key 232 holds a first value "1" and key 234 holds a second value "2" and are grouped into the same node 230 because no key from the above level 224 has a value between "1" and "2."

As the B-tree may be built bottom-up, the number of levels does not need to be determined in advance. When the selection function is applied on the key of the received data element, the selection function may return a level on which the data element is to be stored. In FIG. 2, a selection function is applied at step 270 on key 211 of data element 210, which returned level 224 as the level to store data element 210 at step 272 to find level. Within a level, only one node may store the data element due to the order of the stored keys. When the appropriate node is found, the data element is stored in that node. In FIG. 2, node 290 is found at step 274 as the appropriate node to store the data element 210.

There may be a universal selection function for all possible levels within the B-tree. This type of a selection function may return the level on which a data element needs to be stored. There may also be a series of selection functions, where one selection function may exist per level of the B-tree. As each selection function for a particular level is applied, the selection function may indicate whether or not the data element should be stored at that particular level. Additionally, a series of selection functions may also be used to return a level where to store the data element. For example, an additional function may be set up with a counter where each of the selection functions within the series is applied on the data element, incrementing the counter for each level. When a selection function for a current level indicates that the data element should be stored at that level, the additional function may return the counter which indicates the level for storing the data element. Selection functions may be constructed so as to tune the expected size of the nodes under probability theory. An expected number of levels may be deduced from the expected size of the nodes and the number of data elements in the B-tree. The expected number of levels may be used to limit the maximum level returned by the selection function, which may limit extreme operating situations. For example, if S is the expected size of nodes, then a L-level B-tree may store $(S+1)^{\wedge}(L+1)$ nodes.

The selection function may be chosen based on a probable output of the selection function applied to the data. For example, a probability of moving a key to the next level may be chosen. From this probability, a selection function may be chosen so that it is highly improbable to find a set of keys where the probability of moving a random key from this set to the next level is different of the chosen probability. For example, where $\omega$ represents all possible keys, $F_0$ represents a selection function, k represents a key, and p represents the probability of moving a key to the next level, a selection function may be chosen where it is highly improbable to find a subset $S_0 \subset \Omega$ of keys where, if k is chosen at random within $S_0$, probability $(F_0(k)=1)=p$, and so on for all $F_i$.

The selection function may use Strict Avalanche Criterion (SAC) properties, such that when applied to two inputs that differ by one bit, there is a 50% probability that the results of the function will be different. For example, a function f satisfies SAC when, if two inputs X and X' differ by one bit, each bit of f(X) has a 50% probability of being different from f(X'). Moreover, a selection function may also be chosen such that for a given level of the B-tree, when the function is applied on any given key, the result may be 0 or 1, where 0 may indicate the key does not belong at the given level and 1 may indicate that the key belongs at the given level. A selection function may use a cryptographic hash function. For example, for a hash function producing hashes of N bits represented by H(k), and an expected size of nodes of $2^n-1$, the selection functions may be $F_i(k)=(H(k) \mod 2^{ni}==0)$.

Example Methods

Further to the example systems described above, example methods are now described. Such methods may be performed using the systems described above, modifications thereof, or any of a variety of systems having different configurations. It should be understood that the operations involved in the above methods need not be performed in the precise order described. Rather, various operations may be handled in a different order or simultaneously, and operations may be added or omitted.

Figure 3A:
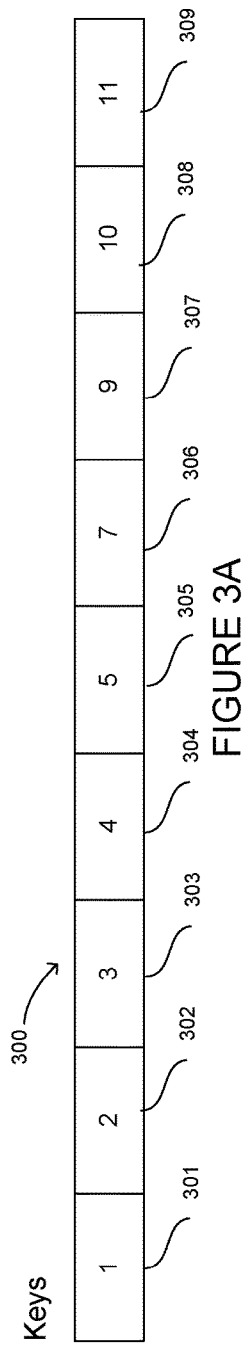
FIGS. 3A-3B illustrate an example of constructing a uniquely represented B-tree in accordance with aspects of the disclosure.
Figure 3B:
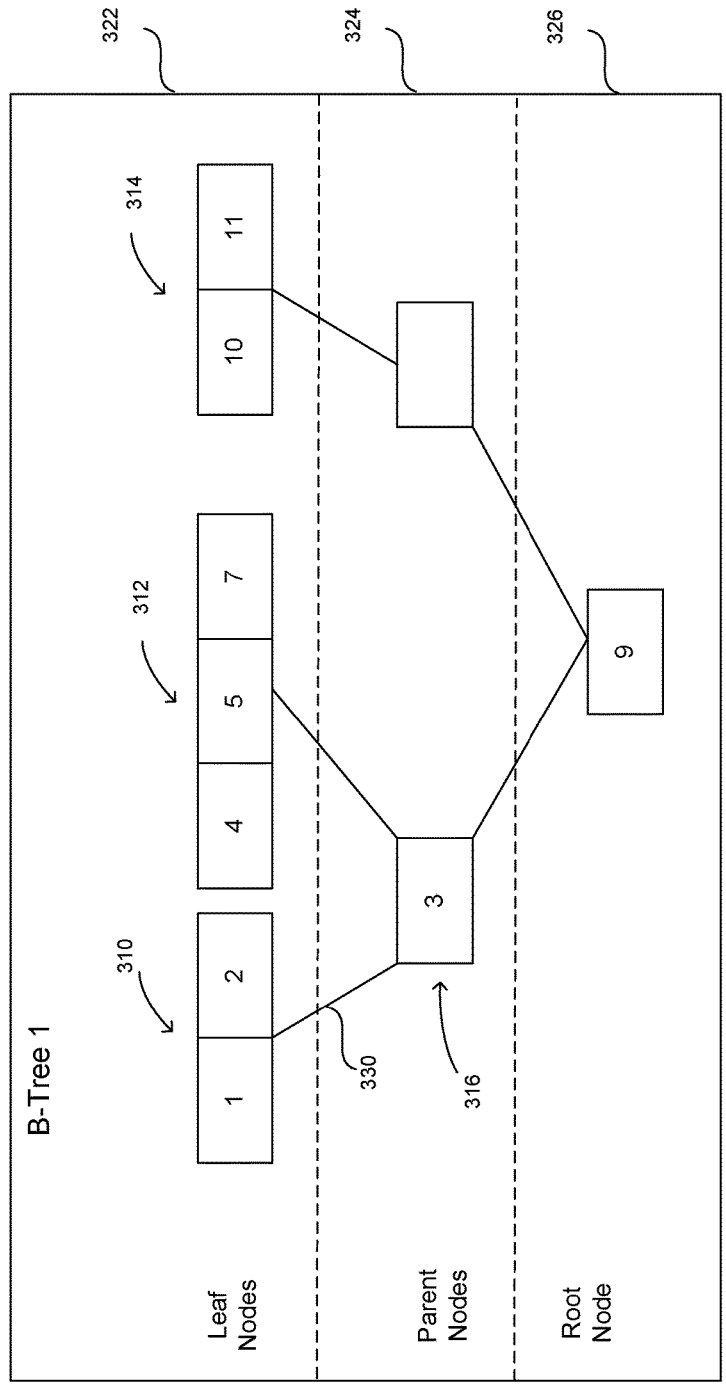

FIGS. 3A-3B illustrate an example of constructing a B-tree. An initial B-tree may be constructed using the chosen selection function. Initially, all of the keys of a data set may be sorted, for example by value, and placed on a bottom level of a B-tree. The chosen selection function is applied using each key, starting with the first key of the sorted keys on the bottom level and repeating for each key in the sorting order. If the applied selection function is true for a particular key, then all keys before the particular key which have not been grouped in a node may be grouped together in a first node. A link to the first node may be associated to the particular key. The particular key may be moved to the next level. The function may be applied to remaining keys of the bottom level, moving to the next level any key meeting the criteria set for the chosen selection function. All remaining keys may be grouped in a last node and a link to the last node maybe associated to the last key on the next level. If the next level is not empty, the selection function is applied to all data elements on the next level, and particular data elements may be moved based on the result. When an empty level is encountered, the constructing of the B-tree ends. By way of example, as shown in FIG. 3A-3B, data 300 containing a plurality of data elements is received. Each of the data elements holds a key, in a sorted order. The keys are keys 301-309 representing values: 1, 2, 3, 4, 5, 7, 9, 10, and 11. Here, the chosen selection function $F_i(k)=(k \mod 3^i==0)$, where i represents the level of the B-tree and k represents the key. The function is applied on each of the keys of the data. The first key that returns the result 0 when the chosen function is applied is 3 and is selected. All keys before 3, which include 1 and 2, are grouped in a first node 310 on the bottom level 322. A link 330 to first node 310 is associated with key 3 and key 3 is moved to the next level 324, which is the second level. The next key returning a result 0 is 9. All keys before 9 which were not grouped (4, 5, and 7) are grouped in a second node 312, and a link to the second node is associated with 9 (not shown). The remaining keys (10 and 11) are grouped in a third node 314 and a link to the third node 314 is associated with the last key (9) of second level 324. Another round is applied for the next level. For second level 324, the function is applied on keys 3 and 9. The only key returning a result 0 is 9, and as such, it is moved to the next level 326, the third level. When the function is applied on the only key 9 on level 326, it does not return a result 0, so no key is moved to the next level. Since the next level is empty, the process ends. The resulting B-tree is depicted in FIG. 3B.

For an existing B-tree, the same chosen selection function may be used for updating the B-tree. Updating the B-tree may include adding data, deleting data, or other modifications.

Figure 4A:
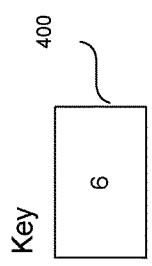
FIGS. 4A-4B illustrate an example of adding a new element to a uniquely represented B-tree in accordance with aspects of the disclosure.
Figure 4B:
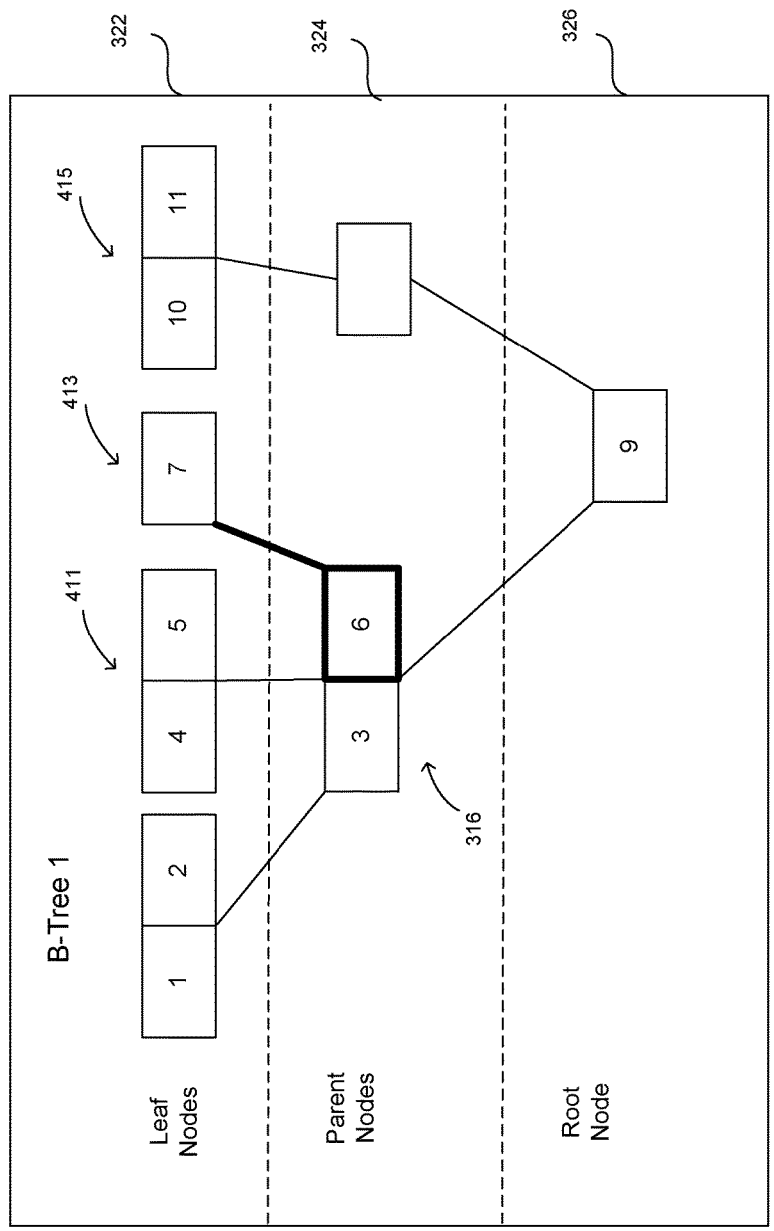

FIGS. 4A-4B illustrate an example of adding a new element to the B-tree. Initially, a leaf node in the B-tree may be identified where the new element is to be added, based on a comparison between the new key and the existing keys in each leaf node of the B-tree. Then applying the selection function, it may be determined whether the new element belongs in the current level or the parent node in the next level. If it belongs in the parent node, the leaf node is split and the new element may be added to the parent node. For example, as shown in FIGS. 4A-4B, a new element 400 with the key 6 may be added to B-tree 1 depicted in FIG. 3B. A leaf node 312 containing the keys 4, 5, and 7 is identified as the node where element 400 with key 6 should be added, based on a comparison between all keys on leaf node 312 to key 6. Since the selection function returns 0 when applied on element 400 with key 6, it is determined that element 400 with key 6 does not belong at the current level 322, and it belongs in the parent node 316 on the next level 324. Thus, leaf node 312 is split in two nodes: node 411 containing 4 and 5 and node 413 containing 7, and element 400 with key 6 is added on the parent node 316 containing key 3. The resulting B-tree is depicted in FIG. 4B.

Figure 5A:
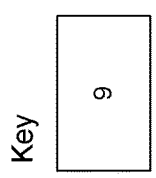
FIGS. 5A-5B illustrate an example of removing an existing element from a uniquely represented B-tree in accordance with aspects of the disclosure.
Figure 5B:
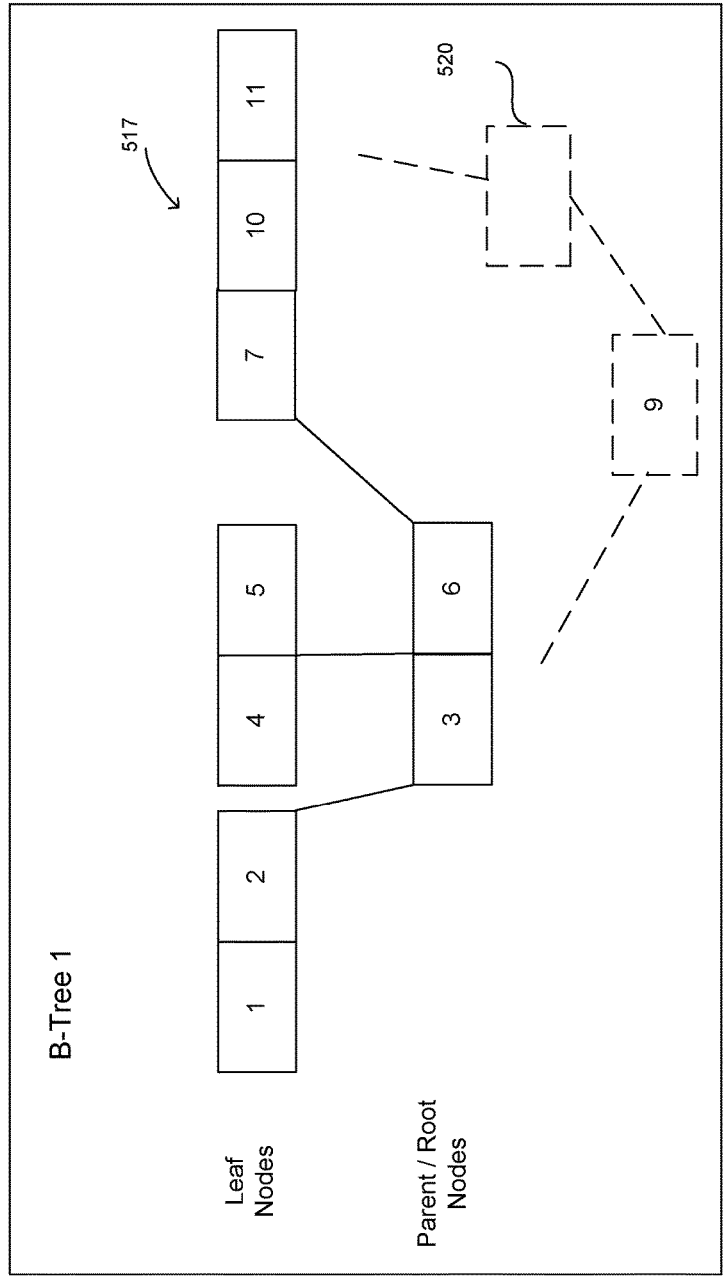

FIGS. 5A-5B illustrate an example of removing an existing element from the B-tree. The existing element is identified on the B-tree, for example by searching, and removed.

The child nodes of the existing elements are merged together. This may require additional merges down the tree. For example, grandchild nodes of the removed element may also need to be merged. For example, as shown in FIG. 5A, the key 9 is requested to be removed from the B-tree. Once key 9 is found on the B-tree, the keys 10 and 11, which were on a child node 415 of key 9 (as shown in FIG. 4B), are merged with key 7 from the neighboring node 413 of the same level 322 (as shown in FIG. 4B), resulting in a new node 517 (as shown in FIG. 5B). Then key 9 and its empty child key 520 are removed from the B-tree. The resulting B-tree is depicted in FIG. 5B.

Data structures may be updated on different devices and synchronized amongst the devices applying the selection function. For example, the first device and a second device may each update a copy of an identical B-tree with first data and second data, respectively. The second device may apply the selection function on the second data, identify a second node of the second B-tree on the second device based on the result of the applied function, and update the second B-tree at the second node using the second data. Because the same selection function is applied in making all updates, the internal nodes may be represented consistently no matter which device updates the B-trees. Thus, when the second device updates the second B-tree, the update may be synchronized with the update of the first B-tree made by the first device.

Figure 6:
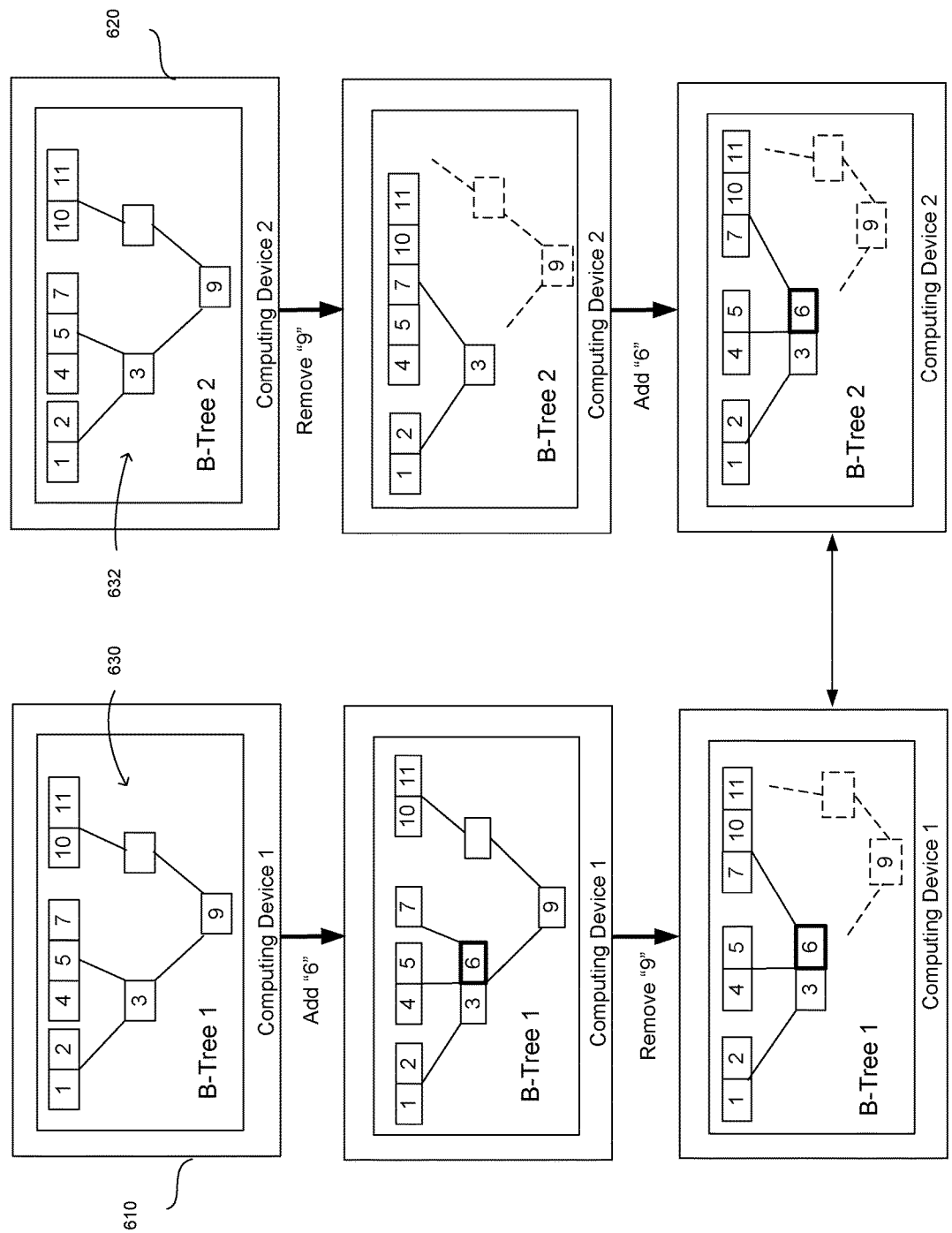
FIG. 6 is an example of synchronization between two computing devices in accordance with aspects of the disclosure.

FIG. 6 illustrates an example of different computing devices making updates to the respective B-trees on each device while maintaining a consistent representation of the nodes in the B-trees. A first device 610 updates B-tree 630 to add element 6 to the B-tree and to remove element 9. A second device 620 updates B-tree 632, which was initially same as B-tree 630, with the same transactions as the first device, but in a different order. In this example, second device 620 removes element 9 and then adds element 6. Both updates represent the same internal nodes as a result of applying the selection function. Thus, the two updates are synchronized.

Figure 7:
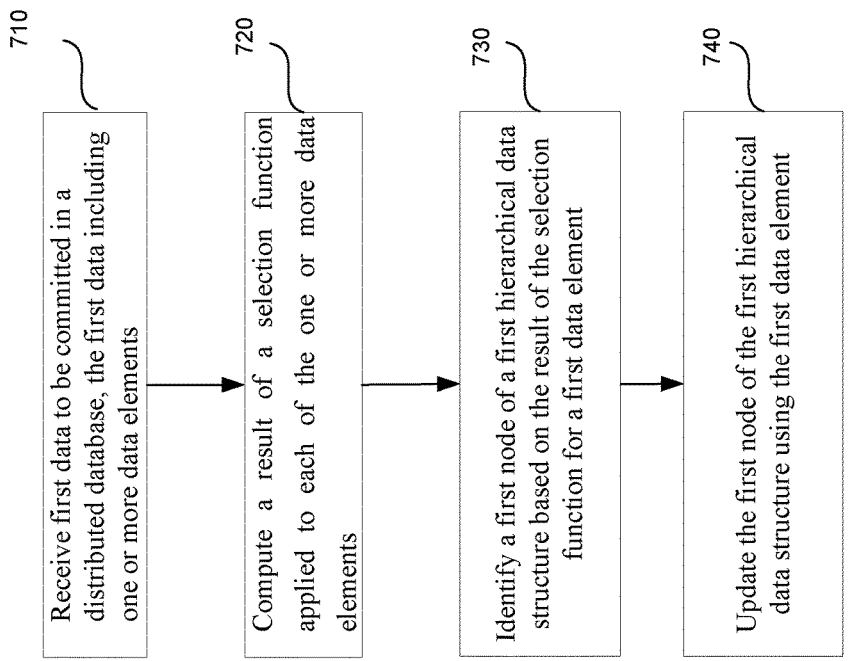
FIG. 7 is an example flow diagram in accordance with aspects of the disclosure.

FIG. 7 is an example flow diagram 700 including a method for updating a hierarchical data structure. The hierarchical data structure may be a B-tree. For example, at block 710, first data to be committed in a distributed database is received. The first data may include one or more data elements.

At block 720, a result of a selection function is computed. For example, the selection function is applied to each of the one or more data elements, producing a separate result for each of the one or more data elements. The selection function may include a cryptographic hash function. The cryptographic hash function may be selected based on a probable output of the cryptographic hash function.

At block 730, a first node of a first hierarchical data structure is identified for a first data element of the one or more data elements. For example, the first node may be identified based on the result of the selection function applied to the first data element. The first node may be a node already existing in a B-tree, or it may be a node to be added to the B-tree. Where the first node will be added, identifying the node may further include identifying where the node will be positioned in the B-tree, and updating associated nodes, such as child nodes, accordingly. Where the first node already exists, the first node may be removed from the B-tree. When the first node is removed, identifying the first node may further include searching the existing element and merging a child node of the existing element with a neighboring element.

At block 740, the first node of the first hierarchical data structure may be updated using the first data element. For example, the first data element may be stored at the first node. In other examples, the first node and the data stored at the first node may be removed.

The operations of blocks 710-740 may be repeated, for example, for each data element of the received data. For example, a second node of the hierarchical data structure may be updated using a second data element. Regardless of the order of updating the data structure, representation of the data structure will be the same. For example, if the second node is updated using the second data element, and then the first node is updated using the first data element, the data structure will have the same internal nodes as it would if the first node was updated first and the second node was updated second. In some examples, a second data structure may be updated by receiving data including the second data elements. For example, the second data structure may reside on a second device in a distributed database. If the second data structure is the same as the first data structure, and the second data element is the same as the first data element, the second data structure will have the same representation as the first data structure after both are updated.

Figure 8:
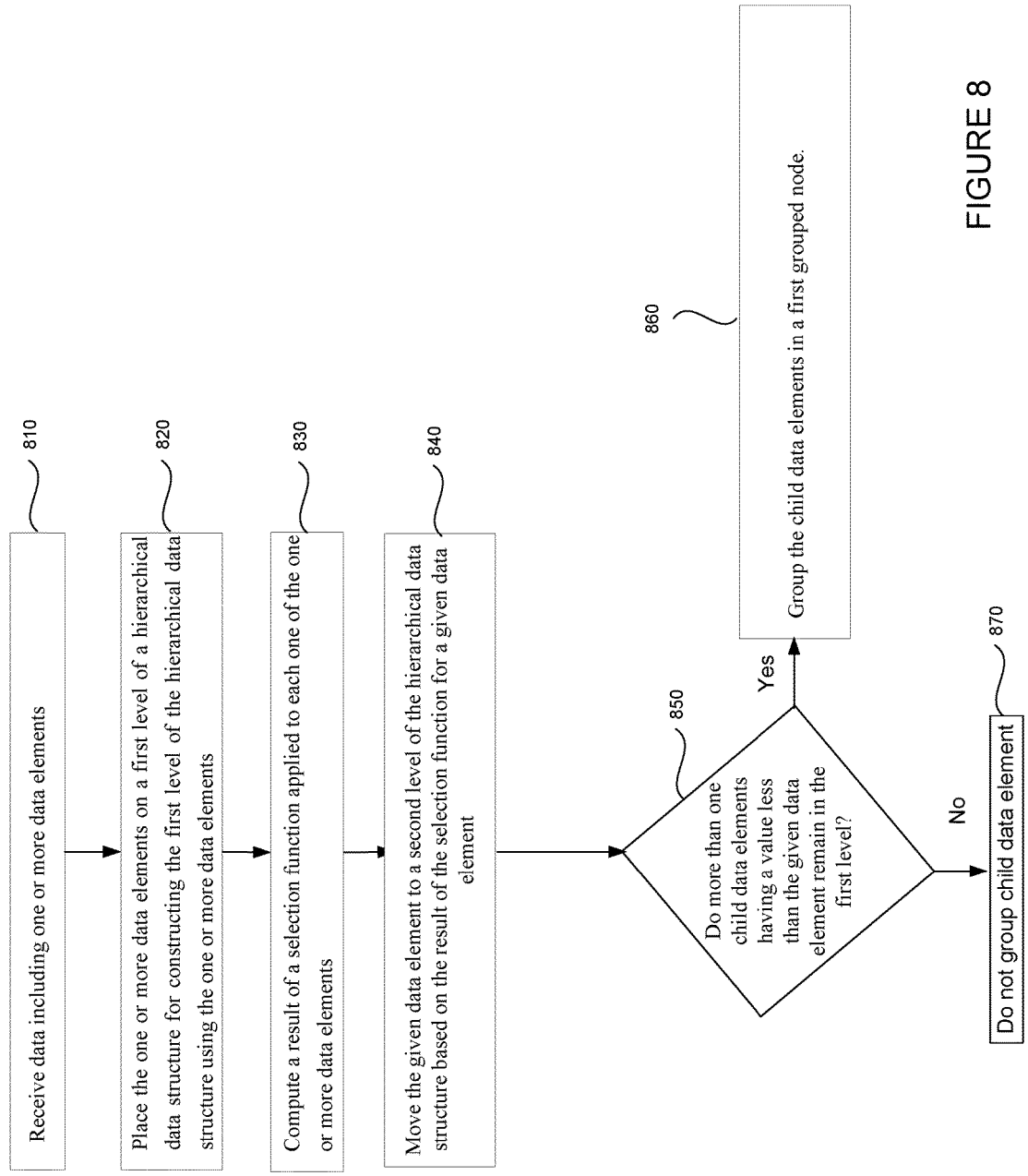
FIG. 8 is another example flow diagram in accordance with aspects of the disclosure.

FIG. 8 is an example flow diagram 800 including a method for constructing a hierarchical data structure. For example, at block 810, data is received. The data may include one or more data elements. Each data element may include a key and a value. At block 820, the one or more data elements may be placed on a first level of the hierarchical data structure for constructing the first level of the hierarchical data structure.

At block 830, a result of a selection function may be computed by applying the selection function to each one of the one or more data elements. For example, the selection function may include a cryptographic hash function. In some examples, a different selection function may be used for each level of the hierarchical data structure. For example, N selection functions may be used to build a hierarchical data structure of N levels. In this case, the selection function for a given level returns "true" if the data element should be stored at that level, and "false" if the data element should be stored at a different level. In other examples, the same selection function may be used for every level of the data structure. In such example, the selection function returns a level of the data structure at which the data element should be stored. Regardless of whether one selection function is used or different selection functions for each level, the resulting data structures may be equivalent. For example, for a B-tree built using different selection functions for each level, a separate function can be created that goes through each of the different functions in order, incrementing a counter until finding a function that returns true and returning this counter.

At block 840, a given data element may be moved to a second level of the hierarchical data structure based on the result of the selection function for the given data element. Additionally, for example, the selection function may be applied on additional data elements on the first level. Based on the result of the selection function applied on the additional data elements, additional data elements may be moved to a second level. It may be determined whether any data elements exist on the second level, and if so, the selection function may be updated for the second level. An updated selection function may be applied on the second level data elements, and based on the result of the updated selection function, a second level data element may be moved to the next level. Until the next level contains no more data elements, the selection function may be updated for each of the next levels and data elements may be moved to the level above the next level based on the result of the updated selection function for the next level.

At block 850, it is determined whether more than one child data elements having a value less than the given data element remain in the first level of the hierarchical data structure. If more than one child data elements remain, then at block 850, the child data elements may be grouped in a first grouped node. If more than one child data elements having a value less than the given data element do not remain in the first level, at block 870, the child data element may not be grouped in a node. If an additional data element is moved to the second level, then if more than one additional child data elements having a value less than the additional data element remain in the first level and the additional data elements have not been grouped in a node yet, then the additional child data elements may be grouped in an additional grouped node. If more than one additional child data elements having a value greater than the additional data element remain in the first level, the additional child data elements may be grouped in another grouped node. Grouping data elements in such manner may be repeated for each of the next level if the selection function is updated and applied for each of the next level.

The features described above may allow for improved representations of a B-tree. In this regard, the unique representation of the B-tree allows for only a segment of the database to be sent over to other devices and still be able to maintain synchronization amidst of different activities performed on the B-tree by different devices. Thus, ensuring uniquely representing B-trees may ensure that modifications to a data structure with the same content, but generated through different means, such as low latency synchronization or merge commits, are consistent and do not require excessive data exchange. Accordingly, synchronization of devices in a distributed database is improved.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, at a first computing device, first data to be committed in a distributed database, the first data including one or more data elements;
computing, with one or more processors, a result of a selection function applied to each of the one or more data elements;
identifying, with the one or more processors, based on the result of the selection function for a first data element, a first node of a first hierarchical data structure maintained by the first computing device, wherein the hierarchical data structure is a B-tree including a plurality of different nodes arranged in a plurality of different levels; and
updating, with one or more processors, the first node of the first hierarchical data structure using the first data element;
identifying, with the one or more processors, based on the result of the selection function for a second data element, a second node of the first hierarchical data structure maintained by the first computing device;
updating, with one or more processors, the second node of the first hierarchical data structure using the second data element;
wherein the first hierarchical data structure has the same internal nodes and node representation regardless of the order of updates of the first and second data elements.

2. The method of claim 1, wherein the selection function includes a cryptographic hash function.

3. The method of claim 2, wherein the cryptographic hash function is selected based on a probable output of the cryptographic hash function when applied to each data element.

4. The method of claim 1, wherein updating the first node of the first hierarchical data structure comprises adding the first data element.

5. The method of claim 4, wherein identifying the first node of the first hierarchical data structure further comprises:
finding, with the one or more processors, a leaf node in the first hierarchical data structure where the leaf node is within a branch where the first data element is to be added;
determining, with the one or more processors, based on the result of the selection function for the first data element, whether the first data element should be added to the leaf node;
when the first data element should be added to the leaf node, adding the first data element to the leaf node, such that the leaf node is the first node; and
when the first data element should not be added to the leaf node, adding the first data element to a parent node of the leaf node and dividing the leaf node in two separate leaf nodes when the leaf node is a grouped node.

6. The method of claim 5, further comprising:
when the first data element is added to the parent node, updating the selection function for a level of the hierarchical structure that holds the parent node;
determining, with one or more processors, based on an updated result of the updated selection function for the first data element, whether the first data element should be moved to a grandparent node; and
when the first data element should be moved to a grandparent node, moving, with the one or more processors, the first data element to a grandparent node and dividing the parent node in two separate parent nodes when the parent node is a grouped node.

7. The method of claim 1, wherein updating the first node of the first hierarchical data structure comprises removing an existing element.

8. The method of claim 7, wherein identifying the first node of the first hierarchical data structure further comprises:
searching, with the one or more processors, the existing element in the first hierarchical data structure;
merging, with the one or more processors, elements of a child node of the existing element with elements of another existing child node; and removing, with the one or more processors, the existing element from the first hierarchical data structure.

9. The method of claim 8, wherein merging comprises grouping elements of the child node of the existing element together with elements of the another existing child node.

10. The method of claim 9, wherein merging further comprises additional merging of a grandchild node of the existing element with elements of another existing grandchild node.

11. The method of claim 1, further comprising:
receiving, at a second computing device, the first data to be committed in the distributed database;
computing, with one or more second processors at the second computing device, the result of the selection function applied to each of the one or more data elements;
identifying, with the one or more second processors, based on the result of the selection function for the first data element; a first node of a second hierarchical data structure maintained by the second computing device;
updating, with the one or more second processors, the first node of the second hierarchical data structure using the first data element;
identifying, with the one or more second processors, based on the result of the selection function for the second data element, a second node of the second hierarchical data structure maintained by the second computing device; and
updating, with one or more second processors, the second node of the second hierarchical data structure using the second data element;
wherein the first hierarchical data structure and the second hierarchical data structure have the same node representation regardless of the order of insertion of the first and second data elements into each data structure.

12. A method, comprising:
receiving, with one or more processors, data including one or more data elements; and
constructing, with the one or more processors, a first level of a hierarchical data structure using the one or more data elements, wherein the hierarchical data structure is a B-tree including a plurality of different nodes arranged in a plurality of different levels, the constructing comprising:
placing, with the one or more processors, the one or more data elements on the first level of the hierarchical data structure;
computing, with the one or more processors, a result of a selection function applied to each one of the one or more data elements;
moving, with the one or more processors, based on the result of the selection function for a given data element, the given data element to a second level of the hierarchical data structure;
when more than one child data elements having a value less than the given data element remain in the first level of the hierarchical data structure, grouping, in a first grouped node, the child data elements;
determining, with the one or more processors, based on the result of the selection function for an additional data element on the first level, whether the additional data element should be moved to the second level of the hierarchical data structure;
wherein the hierarchical data structure has the same internal nodes and node representation regardless of the order of moving the given data element and the additional data element.

13. The method of claim 12, wherein the selection function is different for each level of the hierarchical data structure.

14. The method of claim 12, wherein the selection function includes a cryptographic hash function.

15. The method of claim 12, further comprising:
when the additional data element should be moved to the second level of the hierarchical data structure, then:
moving, with the one or more processors, the additional data element to the second level of the hierarchical data structure; and
when more than one additional child data elements having a value less than the additional data element remain in the first level of the hierarchical data structure, grouping, in an additional grouped node, the additional child data elements; and
when more than one additional child data elements having a value greater than the additional data element remain in the first level of the hierarchical data structure, grouping, in another grouped node, the additional child data elements.

16. The method of claim 15, further comprising:
when the additional data element should not be moved to the second level of the hierarchical data structure, then:
when more than one additional child data elements having a value greater than a last data element on the second level of the hierarchical data structure remain in the first level of the hierarchical data structure, grouping, in a further grouped node, the additional child data elements.

17. The method of claim 15, further comprising:
determining, with the one or more processors, whether one or more second level data elements exist on the second level of the hierarchical data structure;
when the one or more second level data elements exist, then:
updating, by the one or more processors, the selection function for the second level of the hierarchical data structure;
computing, with the one or more processors, an updated result of the selection function applied on the one or more second level data elements;
moving, with the one or more processors, based on the updated result of the updated selection function for a given second level data element, the given second level data element to a next level of the hierarchical data structure; and
when more than one second level child data elements having a value less than the given second level data element remain in the second level of the hierarchical data structure, grouping, in a second level grouped node, the second level child data elements.

18. A system, comprising:
one or more memories of a first computing device storing a first hierarchical data structure, wherein the first hierarchical data structure is a B-tree including a plurality of different nodes arranged in a plurality of different levels;
one or more processors in communication with the one or more memories, the one or more processors configured to:
receive first data to be committed in a distributed database, the first data including one or more data elements;
compute a result of a selection function applied to each of the one or more data elements;

identify, based on the result of the selection function for a first data element, a first node of the first hierarchical data structure;

update the first node of the first hierarchical data structure using the first data element;

identify, based on the result of the selection function for a second data element, a second node of the first hierarchical data structure maintained by the first computing device;

updating, with one or more processors, the second node of the first hierarchical data structure using the second data element;

wherein the first hierarchical data structure has the same internal nodes and node representation regardless of the order of updates of the first and second data elements.

19. The system of claim 18, wherein the selection function is selected based on a probable output of the selection function when applied to the data elements.

20. The system of claim 18, further comprising:

a second computing device, comprising:
one or more second memories;
one or more second processors in communication with the one or more second memories, wherein the one or more second processors are configured to:

receive the first data to be committed in the distributed database;

compute the result of the selection function applied to each of the one or more data elements;

identify, based on the result of the selection function for the first data element; a first node of a second hierarchical data structure maintained by the second computing device;

update the first node of the second hierarchical data structure using the first data element;

identify, based on the result of the selection function for the second data element, a second node of the second hierarchical data structure maintained by the second computing device; and update the second node of the second hierarchical data structure using the second data element;

wherein the first hierarchical data structure and the second hierarchical data structure have the same node representation regardless of the order of insertion of the first and second data elements into each data structure.

* * * * *